United States Patent [19]

Noh et al.

[11] Patent Number: 4,701,994
[45] Date of Patent: Oct. 27, 1987

[54] AUTOMATIC TOOL ASSEMBLY APPARATUS

[75] Inventors: Akihiko Noh, Chigasaki; Shinichi Sato, Kawasaki; Itsusuke Kakuda, Yokohama; Shigeyuki Kanno, Hiratsuka, all of Japan

[73] Assignees: Kabushiki Kaisha Toshiba; Toshiba Tungaloy Co., Ltd., both of Kawasaki, Japan

[21] Appl. No.: 909,339

[22] Filed: Sep. 19, 1986

[30] Foreign Application Priority Data

Sep. 20, 1985 [JP] Japan ................................. 60-206330
Sep. 20, 1985 [JP] Japan ................................. 60-206331
Nov. 30, 1985 [JP] Japan ................................. 60-269673

[51] Int. Cl.$^4$ ............................................. B23Q 3/157
[52] U.S. Cl. ..................................... 29/568; 29/26 A; 29/563; 409/234
[58] Field of Search .................... 29/26 A, 563, 564.1, 29/568, 27 C, 50, 52, 53, 54, 55, 56.6; 409/232, 234; 408/239 R, 241

[56] References Cited

U.S. PATENT DOCUMENTS 3,667,114 6/1972 Smith et al. ........................... 29/568
4,525,918 7/1985 Puritz ................................... 29/568
4,538,341 9/1985 Doi et al. ............................. 29/568
4,654,955 4/1987 Mathie ................................. 29/568

Primary Examiner—Gil Weidenfeld
Assistant Examiner—Glenn L. Webb
Attorney, Agent, or Firm—Oblon, Fisher, Spivak, McClelland, & Maier

[57] ABSTRACT

The present invention relates to an automatic tool assembly apparatus for a modular constituted tool. The automatic tool assembly apparatus has a tool stock unit for storing a plurality of types of modular constituted tools for a machine tool disassembled in units of modules, a tool transfer unit for assembling a predetermined modular constituted tool from a plurality of modules in the tool stock unit and conveying the assembled modular constituted tool from the tool stock unit, and a control unit. The tool stock unit holds the modular constituted tool disassembled in units of modules. The stock position of each module required for assembling a tool requested by the machine tool is indexed from a signal from the control unit. The modules are then sequentially positioned at the assembly position. The tool transfer unit has an assembly head which is movable in a direction to approach and separate from the assembly position in response to an instruction from the control unit. The assembly head sequentially assembles the modules in response to signals from the control unit, thus obtaining the required modular constituted tool.

12 Claims, 20 Drawing Figures

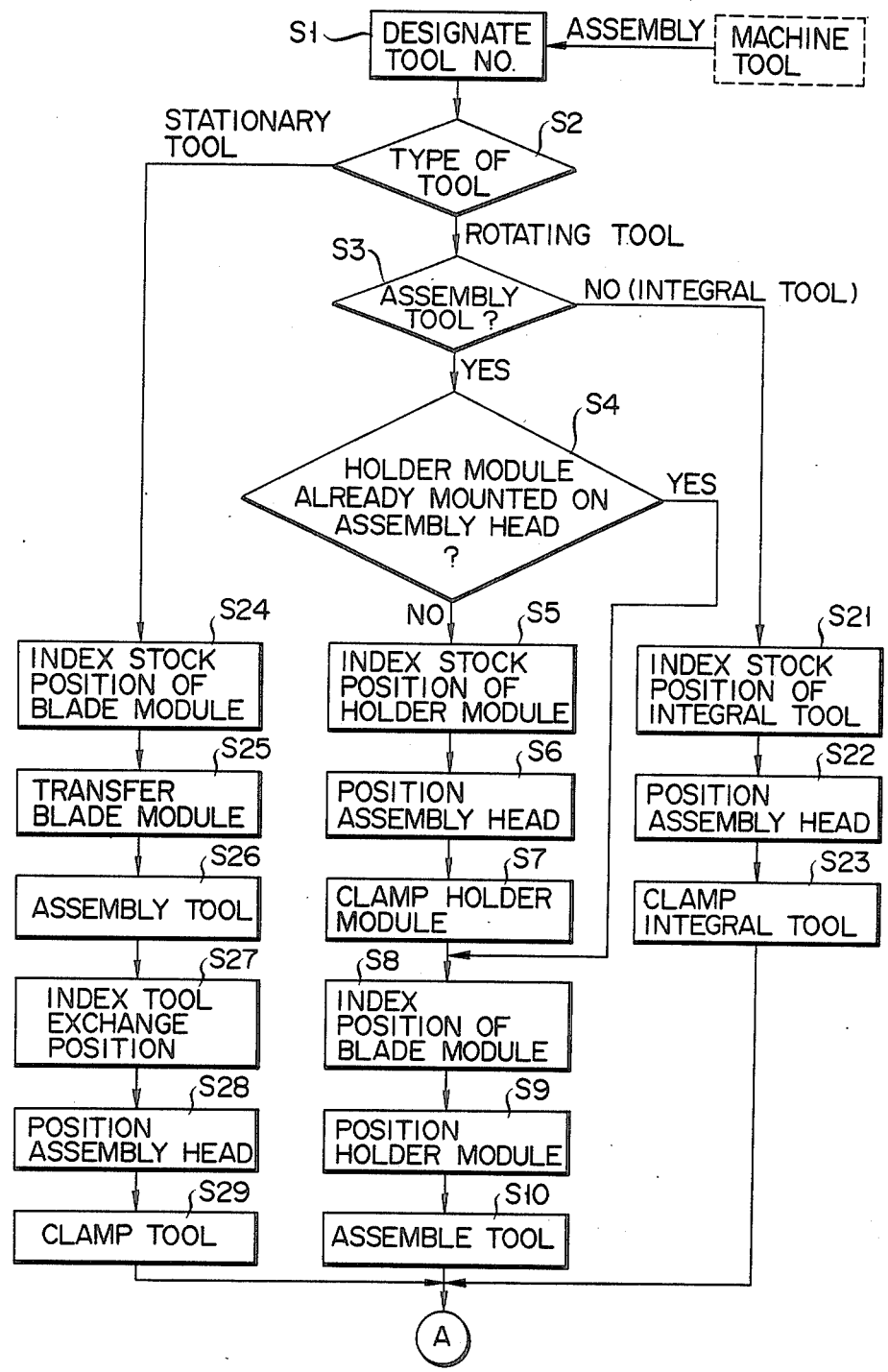
FIG. 6A (ASSEMBLY CYCLE)

FIG. 12
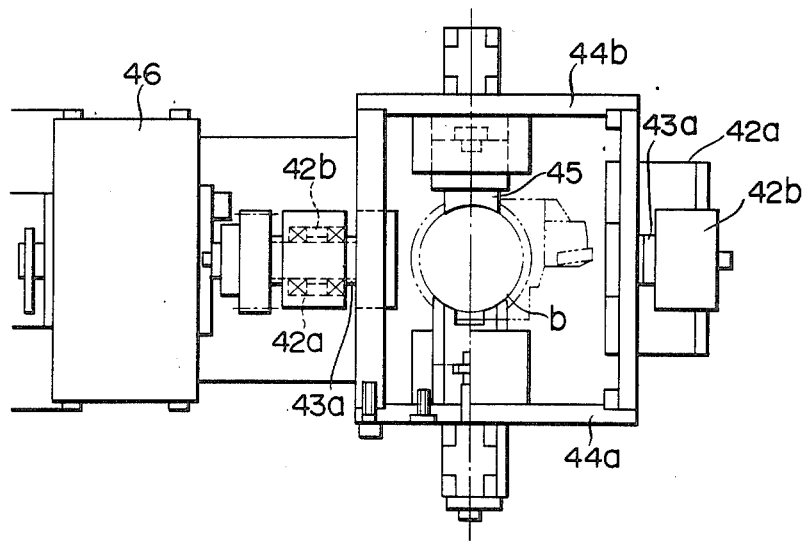
FIG. 13
FIG. 14
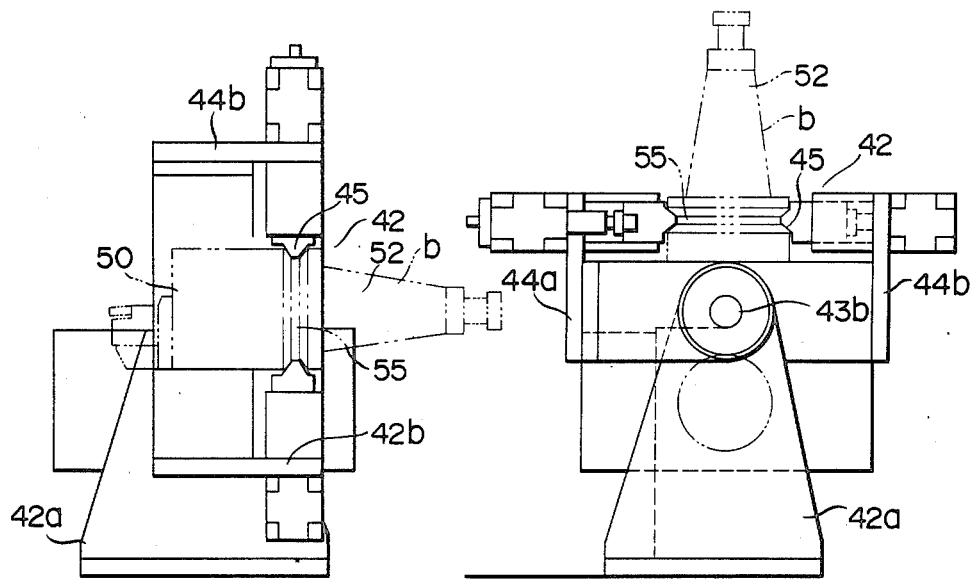

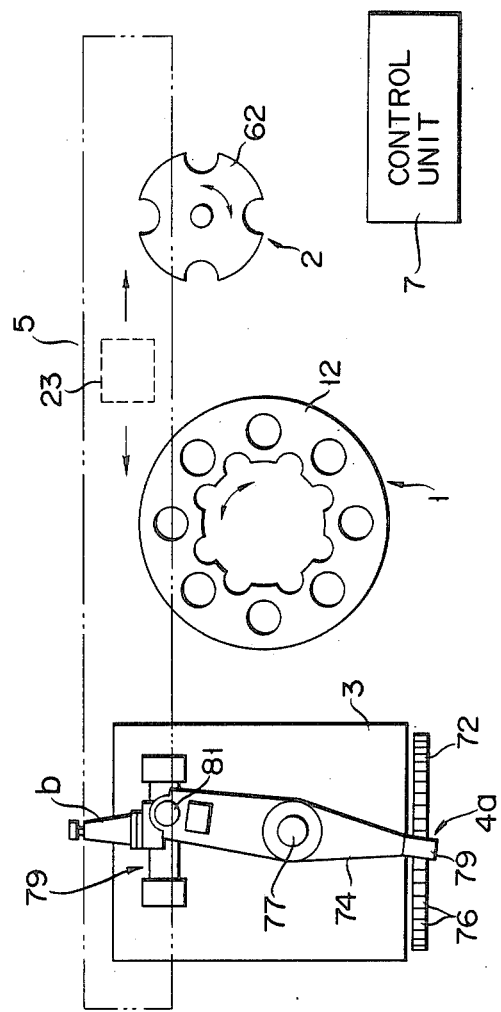

AUTOMATIC TOOL ASSEMBLY APPARATUS

BACKGROUND OF THE INVENTION

1. Field of the Invention

The present invention relates to an automatic tool assembly apparatus for automatically assembling a predetermined tool required for a machine tool from respective modules of modular constituted tools which are divided and stored in units of modules and supplying it to the machine tool and, more particularly, to an automatic assembling apparatus of a modular constituted tool used in a machining center, an NC lathe, a turning center or the like.

2. Description of the Prior Art

An automatic tool exchange apparatus which stores respective tools to be mounted on a machine tool in a tool housing conveys a tool designated in accordance with production control data from the tool housing and feeds the designated tool in the machine tool to automatically exchange tools for a machine tool is conventionally known. An assembly-type modular constituted tool replacing a conventional integral tool has also been developed. Modular constituted tool A of this type has, as shown in FIG. 5, holder module a, adapter module b, and blade module c. Module b is mounted on module a, and module c is mounted on holder module b. Modular constituted tool A shown in FIG. 5 is assembled by mounting blade module c on module a directly or through module b. Only module c at the distal portion of tool A can be exchanged without exchanging all the components of tool A. Therefore, tool A is lightweight, easy to handle, and can reduce the space of the tool housing required for storing the tools.

Conventionally, however, modular tool A is assembled and disassembled manually. More specifically, a plurality of modules a, b, and c are aligned and stocked in the tool housing. The assembly order of modular tool A is determined in accordance with the production control data. The operator picks a required one of respective modules from the tool stock rack of the tool housing, and performs assembling on an assembly table. Thus, many manual procedures are required in assembly and disassembly of tool A. In addition, when the number of modules is increased, an erroneous combination may occur.

An automatic tool rack is known as a tool stocker for storing tools, wherein a plurality of tool holders are provided on an endless chain, and modules are stored in the tool holders and conveyed. In this case, however, modules are stored in and picked up from the respective tool holders manually by an operator.

SUMMARY OF THE INVENTION

It is an object of the present invention to provide an automatic tool assembly apparatus which can automatically assemble a modular constituted tool and can feed it to a machine tool.

It is another object of the present invention to provide an automatic assembly/feed apparatus of a modular constituted tool, which can improve operability and safety, and can simplify a transfer unit for attaching-/detaching a module on a tool stock unit and feeding a modular constituted tool.

It is still another object of the present invention to provide an automatic assembly/feed apparatus of a modular constituted tool, whicn can automatically assemble a modular tool and feed it to respective machine tools, thereby improving operability and safety.

An automatic tool assembly apparatus according to the present invention has a tool stock unit for storing a plurality of types of modular constituted tools in a disassembled state in units of modules, a tool transfer unit for assembling a predetermined tool among a plurality of modules in the tool stock unit, and transferring and feeding the assembled tool from the tool stock unit, and a control unit.

The tool stock unit has a first stock unit for holding a rotating tool as a module constituted tool in a state disassembled in units of respective modules. In the first stock unit, a stock position of a required module corresponding to a tool required by a machine tool is indexed from a signal supplied from the control unit. Thus, the required modules are sequentially positioned at a tool assembly position. The tool transfer unit has an assembly head movable in a direction to approach and separate from the tool assembly position by an instruction from the control unit. The assembly head clamps the modules positioned at the tool assembly position in response to the signal supplied from the control unit, removes the clamped modules from the tool stock unit, and sequentially assembles the clamped modules on a module positioned at another assembly position, thereby preparing a predetermined modular constituted tool. The assembled modular constituted tool is transferred out by a tool transfer unit.

An automatic tool assembly apparatus according to another aspect of the present invention has a magazine for storing a plurality of blade modules for a modular constituted tool consisting of a holder module and a blade module in an aligned state, and a pivotal arm which is pivotal between a blade module exchange position and an assembly position. The pivotal arm has, on an end thereof, a chuck capable of holding the blade module stored in the magazine at the exchange position, and, on the other end thereof, a coupling mechanism for assembling the blade module, which is held at the assembly position by the chuck and transferred, to a holder module.

The other objects, features, and advantages of the present invention will be apparent from the detailed description hereinafter with reference to the accompanying drawings.

BRIEF DESCRIPTION OF THE DRAWINGS

FIGS. 6A and 6B are flow charts of a basic operation state when a tool is assembled by the automatic tool assembly apparatus shown in FIG. 1, the flow charts including steps performed for some particular forms of application;

FIG. 12 is a plan view of a holding mechanism of the automatic tool assembly apparatus shown in FIG. 10;

FIG. 13 is a side view of the holding mechanism horizontally holding a holder module;

FIG. 14 is a view similar to FIG. 13 but in a state vertically holding the holder module;

FIG. 18 is a schematic diagram of an automatic tool assembly/transfer system seen from above.

DESCRIPTION OF PREFERRED EMBODIMENTS

Figure 1:
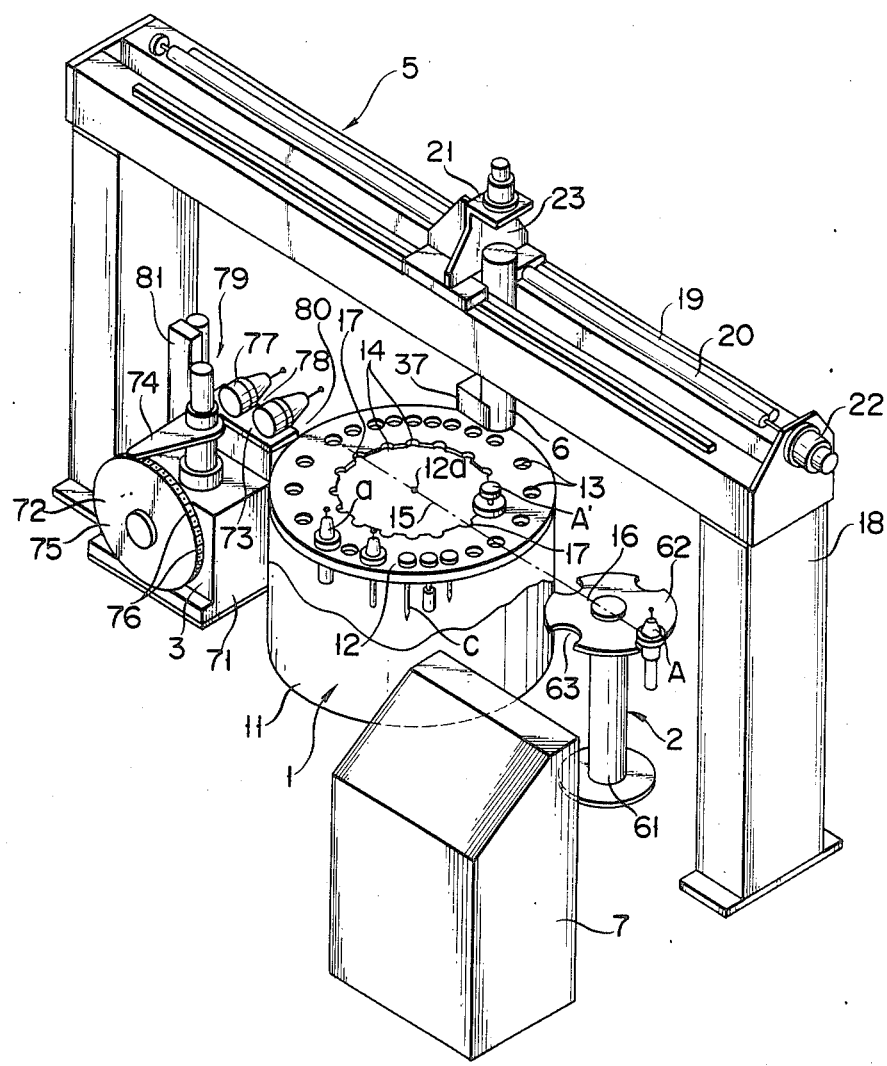
FIG. 1 is a perspective view of an automatic tool assembly apparatus according to an embodiment of the present invention.

The embodiments of the present invention will be described with reference to the accompanying drawings.

FIGS. 1 to 4 show an automatic assembly/feed apparatus of a modular constituted tool according to a first embodiment of the present invention.

Referring to FIGS. 1 to 4, reference numeral 1 denotes a tool stock unit; 2, a tool stocker provided adjacent to stock unit 1; 3, an assembly unit for a stationary tool such as a drilling tool; 5, a tool transfer unit; and 7, a control unit. Assembly head 6 is provided on transfer unit 5 to be reciprocal and vertically movable in order to feed a tool from stock unit 1 to tool stocker 2.

Tool stock unit 1 will be described. Unit 1 has cylindrical main body 11. Turntable 12 is provided on main body 11 and is rotated clockwise and counterclockwise by a drive mechanism (not shown). Turntable 12 has a circular shape. A plurality of through holes are formed in the outer peripheral portion of turntable 12 at equal angular intervals, and define tool holders 13. Holder module a, adapter module b, and blade module c which constitute modular tool A are held by holder 13 such that their axes are aligned in the vertical direction.

Figure 2:
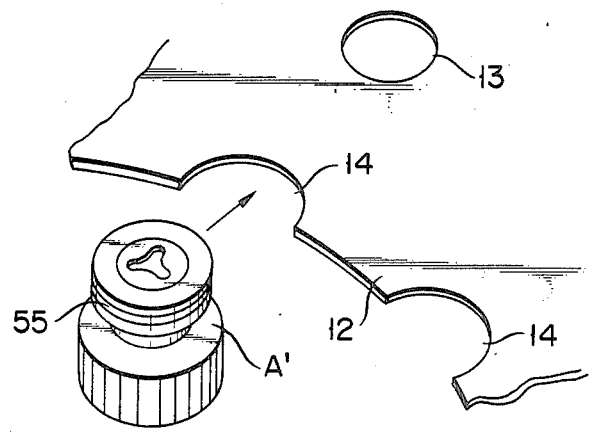
FIG. 2 is a perspective view of a tool holder shown in FIG. 1.

As shown in FIG. 2, a plurality of tool holders 14 for a large tool that are defined by circular notches are provided on the inner peripheral portion of turntable 12 at equal angular intervals. An annular groove formed at a proximal end portion of large tool A' is inserted in holder 14 in the transverse direction and is held thereat. Therefore, each module and large tool A' are arranged to be perpendicular to turntable 12 with their distal ends facing downward. Each module is selectively positioned at assembly position 17 by a means to be described later. Two positions 17 are provided on line 15 passing rotation center 12a of turntable 12.

Tool transfer unit 5 is supported by frames 18 at its two ends, and has guide rod 19 and screw rod 20 extending above stock unit 1 in the transverse direction, and movable base 21 guided by guide rod 19 and engaged with screw rod 20.

Rod 20 is driven by servo motor 22 to rotate. Base 21 has movable table 23 which is vertically movable with respect to assembly position 17. Assembly head 6 is mounted on table 23. Thus, head 6 is vertically moved by table 23 to approach and separate from position 17, and can travel along line 15 passing rotation center 12a of turntable 12 by means of rod 20.

Figure 3:
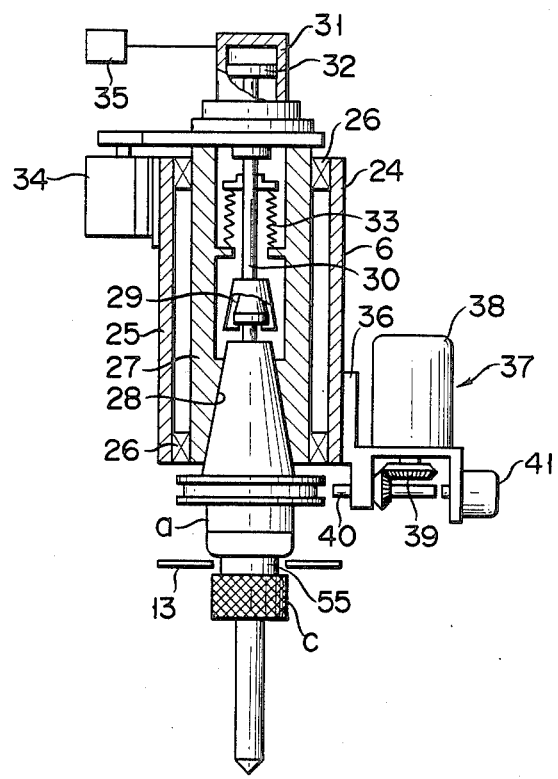
FIG. 3 is a vertical sectional view of an assembly head shown in FIG. 1.

As is shown in detail in FIG. 3, head 6 has a function to hold and assemble modules a, b, and c held by holder 13. More specifically, tool holding member 24 is provided and rotating drum 27 is rotatably supported in holding member main body 25 thereof through bearing 26. Tapered hole 28 is formed at a lower portion of drum 27. Draw bar 30 having collet chuck 29 is provided at a bottom portion of hole 28. Draw bar 30 is linked to piston 32 of hydraulic cylinder 31 provided on drum 27 and is biased in a contracting direction by Belleville spring 33. Note that drive mechanism 34 drives drum 27. Module a of tool A is mounted in hole 28. Nut runner 37 is provided on the side wall of main body 25 through bracket 36. Runner 37 is constituted by drive motor 38, gear mechanism 39, and clamp shaft 40. Shaft 40 is urged against a clamp bolt of tool A by air cylinder 41.

Figure 4:
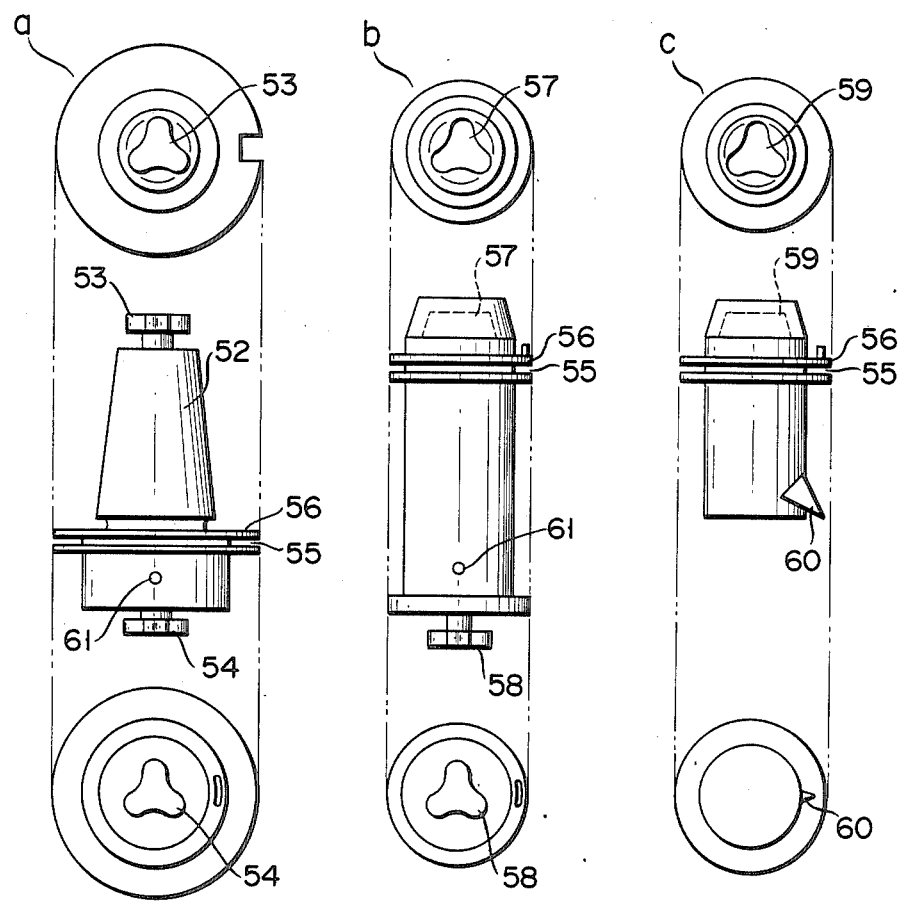
FIG. 4 shows plan, front, and bottom views, respectively, of a modular constituted tool in a disassembled state.
Figure 5:
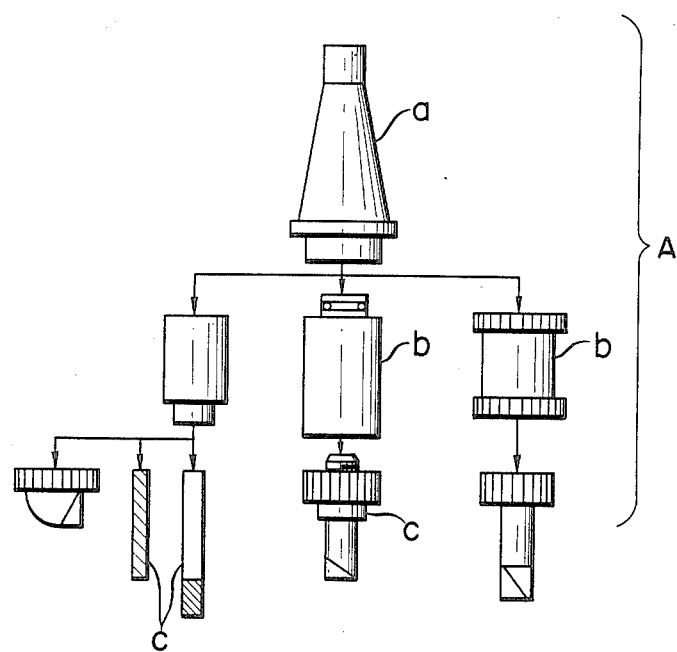
FIG. 5 shows a typical modular constituted tool disassembled in units of modules.

As shown in FIG. 4, tool A has petal-like engaging pawls 53 and 54 at an upper and lower ends, respectively, of tapered portion 52 of its module a. Engaging hole 57 engageable with pawl 54 is provided on the upper end of module b, and engaging pawl 58 projects from the lower end thereof. Engaging hole 59 selectively engageable with either pawl 54 or 58 is formed on the upper end of module c, and blade 60 is provided at a lower end thereof. Module a can be coupled to module c through module b, or directly to module c. Furthermore, flange 56 having annular groove 55 is provided on the outer peripheral surface of module a or c, so that groove 55 formed in flange 56 of either module is engaged with and supported by notch 15 of holder 13. Note that clamp bolt 61 clamps engaging portions of modules b and a, and of modules a and c.

Tapered portion 52 of module a of tool A arranged in the above manner is mounted in tapered hole 28 formed in drum 27 of member 24. Pawl 53 is engaged with collet chuck 29. More specifically, chuck 29 is opened/closed by forward/backward movement of draw bar 30. When piston 32 is moved forward by a hydraulic pressure supplied by hydraulic cylinder 31, chuck 29 is opened and released from pawl 53. When the hydraulic pressure of cylinder 31 is disabled, draw bar 30 is moved backward by a restoring force of spring 33 in order to close chuck 29 and thus to clamp pawl 53.

Tool stocker 2 shown in a right-hand portion of FIG. 1 is provided on line 16 extending from straight line 15 passing rotation center 12a of turntable 12. Stocker 2 has intermittently rotatable disk 62 on the upper end of support column 64. A plurality of tool holding members 63 are provided on the outer peripheral portion of disk 62. Each member 63 is defined by an arcuated notch in the same manner as holder 13, and vertically supports tool A therein.

Assembly unit 3 for a turning tool as a stationary tool shown in the left-hand portion of FIG. 1 will now be described. Unit 3 is used for assembling a modular constituted tool used in a machine tool such as an NC vertical lathe. Reference numeral 71 denotes a main body of unit 3. Magazine 72 and movable table 73 are provided on one and the other sides on main body 71. Pivotal arm 74 is provided between magazine 72 and table 73.

Magazine 72 has disk 75 rotatable clockwise and counterclockwise, and a plurality of tool stock sections 76 provided at equal angular intervals on the outer peripheral portion of disk 75. Blade module d constituting modular constituted tool B is detachably inserted in each section 76.

Table 73 has first and second holder sections 77 and 78. Sections 77 and 78 hold holder modules e for modular constituted tool B. Table 73 is reciprocal on main body 71. In a neutral state, first holder section 77 opposes assembly position 79 and second holder section 78 opposes exchange position 80. When table 73 moves forward, section 77 opposes exchange position 80. When table 73 moves backward, section 78 opposes position 79.

Coupling mechanism 81 comprises a nut runner opposes position 79. At exchange position 80, tool B is clamped by assembly head 6 of tool transfer unit 5 and is conveyed to a predetermined position of stocker 2. Alternatively, assembled modular tool B can be directly supplied to a machine tool, such as an NC lathe, by a tool transfer unit (not shown) such as a robot.

Position 79 can be provided on a tool mounting section of a machine tool.

Figure 6B:
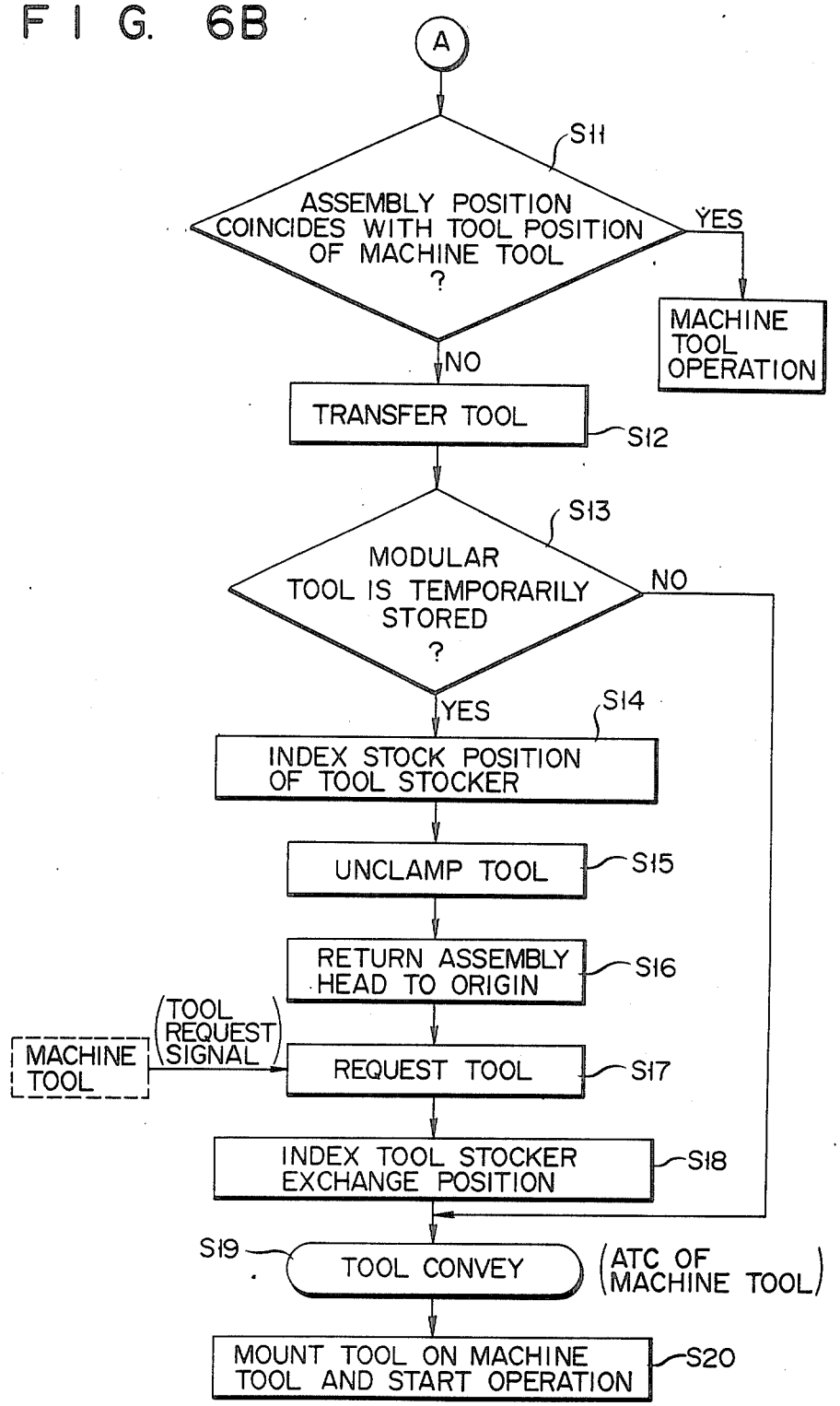

The assembly operation of the automatic assembly/feed apparatus for the modular tool which is configurated in the above manner will be described with reference to the flow charts of FIGS. 6A and 6B.

A tool number code is designated in control unit 7 based on production control data, and a program indicating, e.g., a combination of tools required for machining is loaded (step S1). When the designated tool is tool A used in a machining center, the type of tool is determined by unit 7, and a tool designation signal is input from unit 7 to tool stock unit 1 (steps S2 and S3). Upon this signal input, turntable 12 of the tool stock unit is rotated to index the holder module stock position (steps S4 and S5), expect for a case wherein module a is already mounted on assembly head 6. Respective modules constituting designated tool A are positioned at adjacent assembly position 17 (step S6).

After module a of tool A is positioned at position 17, head 6 is positioned and moved downward. Head 6 is moved downward by table 23, tapered portion 52 of module a is fitted in tapered hole 27 of tool holding member 24, engaging pawl 53 of module a is clamped by chuck 29, and module a is thus clamped (step S7). When module a is clamped in this manner, head 6 is moved upward by table 23. As a result, module a held by head 6 is removed from holder 13 from above.

Subsequently, holder 13 holding module c supplied in accordance with data from control unit 7 is positioned at assembly position 17, and then a blade module stock position is indexed (step S8). At this time, table 23 is moved downward, and module a held by head 6 is aligned with module c vertically held by holder 13 on a straight line (step S9). When head 6 is moved downward, pawl 54 of module a is engaged with hole 59 of module c, and modules a and c are coupled in the vertical direction. Then, module a is rotated by driving of motor 34 and is engaged with pawl 54. At this time, when air cylinder 41 is moved forward and urges clamp shaft 40 of nut runner 37, shaft 40 is engaged with clamp bolt 61. In this state, when motor 38 is driven, shaft 40 is rotated through gear mechanism 39 and clamps bolt 61, thereby completing assembly with tool A by modules a and c (step S10).

Thereafter, head 6 is moved upward again to pull module c from holder 13, and transfers pulled module c to tool stocker 2 by rotation of screw rod 20 of transfer unit 5. In this case, the stock position within stocker 2 is indexed (steps S12 to S14). In the case where the subject apparatus is incorporated in the machine tool, module c is conveyed directly to the machine tool, not through stocker 2, and mounted thereon (step S13). Further, there may be a case where assembly is performed at the tool fitting section of the machine tool (step S11). Stocker 2 has a plurality of tool support members 63 on its disk 62. When a tool is clamped, it is supported since annular groove 55 formed in module a is engaged with member 63 (step S15). Head 6 is then returned to the origin (step S16).

When the above operation is repeated, tools A are sequentially assembled at two assembly positions 17 and supplied to stocker 2 by tool convey unit 5. Tools A temporarily stored in stocker 2 are fed to the tool machine in accordance with the processing order (steps S17 to S20).

In the above embodiment, tool A is constituted by coupling modules a and c. However, the present invention can be applied to a case wherein module c is coupled to module a through module b (steps S21 to S23). Since large tool A' is held by tool holder 14 having a notch formed in the inner peripheral portion of turntable 12, it cannot be picked up only by moving head 6 upward In this case, as described above, head 6 must be moved downward to clamp module a. Then, table 23 is moved by unit 5 in the transverse direction along line 15, i.e., along a direction of the notch of holder 14 and tool A' is picked up, and then head 6 must be moved upward.

When the designated tool is a stationary tool used in an NC vertical lathe or the like, turning tool assembly unit 3 is actuated. More specifically, magazine 72 is rotated, a stock position for designated blade module d is indexed, head 6 is positioned at exchange position 72a (step S24), and pivotal arm 74 is pivoted to hold module d. Then, module d is pulled from tool stock section 76, arm 74 is pivoted again to transfer module d to holder module e on table 73 (step S25), and modules e and d on table 73 are coupled (step S26).

Tool B assembled at position 79 is moved to exchange position 80 by table 73 (step S27). Tool B is held by assembly head 6 of tool transfer unit 5 (steps S28 and S29), and is conveyed to tool stocker 2 (step S12). Alternatively, tool B is directly conveyed to a machine tool such as an NC vertical lathe.

As described above, in the automatic tool assembly apparatus shown in FIGS. 1 to 4, an assembly position is provided on a line passing the rotation center of a turntable of a tool stock unit, so that two assembly positions can be provided. As a result, a designated module can be indexed at a high speed, and different modules can be held at different assembly positions by a single indexing.

In the above embodiment, a unit for assembling and feeding tool B for a machine tool in which a tool is stationary is provided to a unit for automatically assembling and feeding tool A for a machine tool in which a tool is rotated. However, a stationary tool assemble unit is not necessarily required.

The turntable constituting the tool stock unit has a circular shape, holds modules constituting a usual modular tool at its outer peripheral portion and a large size tool at its inner peripheral portion. However, it can hold blade and adapter modules at its outer peripheral portion and a holder module at its inner peripheral portion. The tool stock unit can be an endless chain. The tool to be stored in the tool stock unit can be an integral tool, or a modular constituted tool which is used often can be assembled in advance and be stored in the tool stock unit.

Furthermore, in the above embodiment, the module is coupled to the vertically held holder module from above. However, the module can be coupled from below.

Figure 7A:
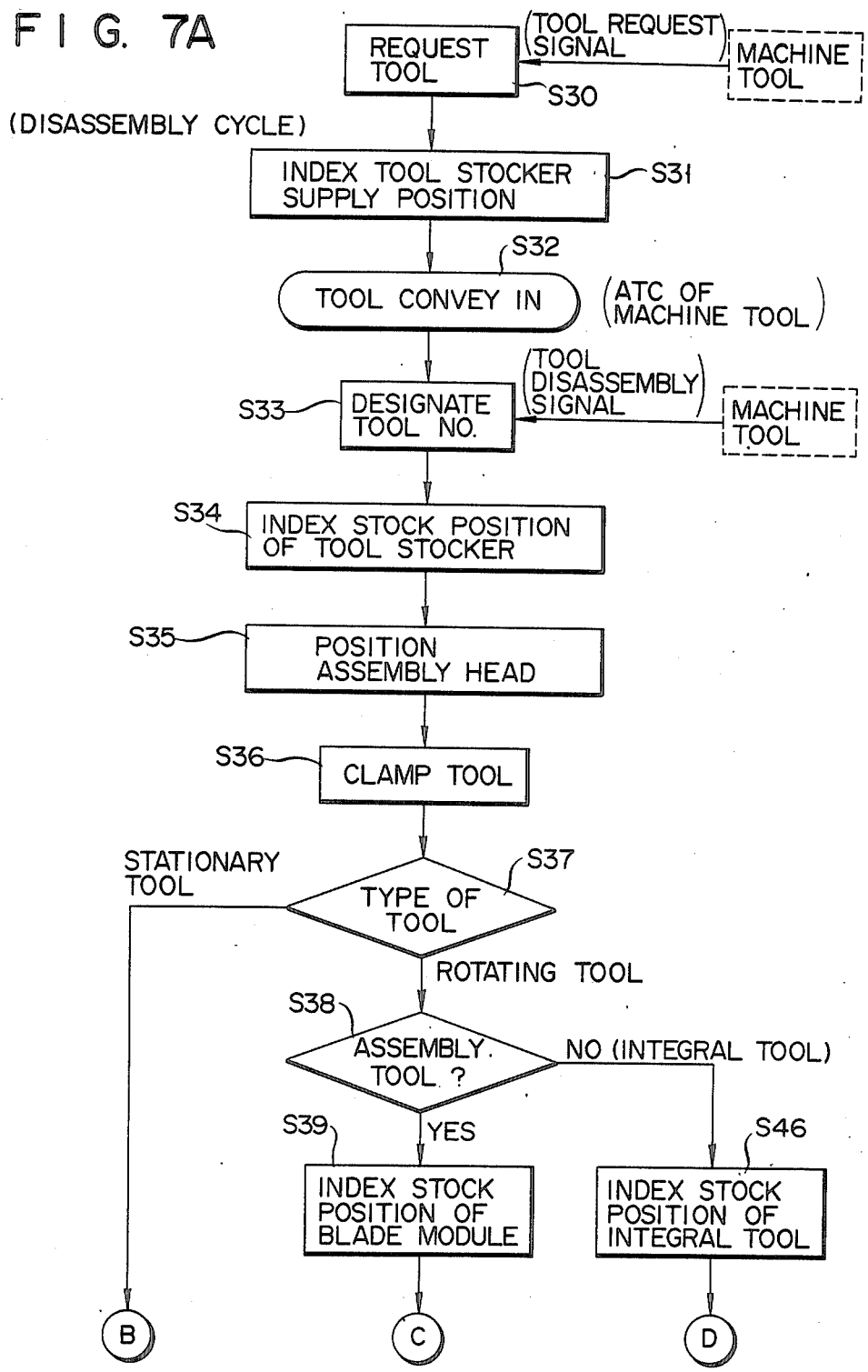
FIGS. 7A and 7B are flow charts of a basic operation state when a tool is disassembled and stored by the automatic tool assembly apparatus shown in FIG. 1.
Figure 7B:
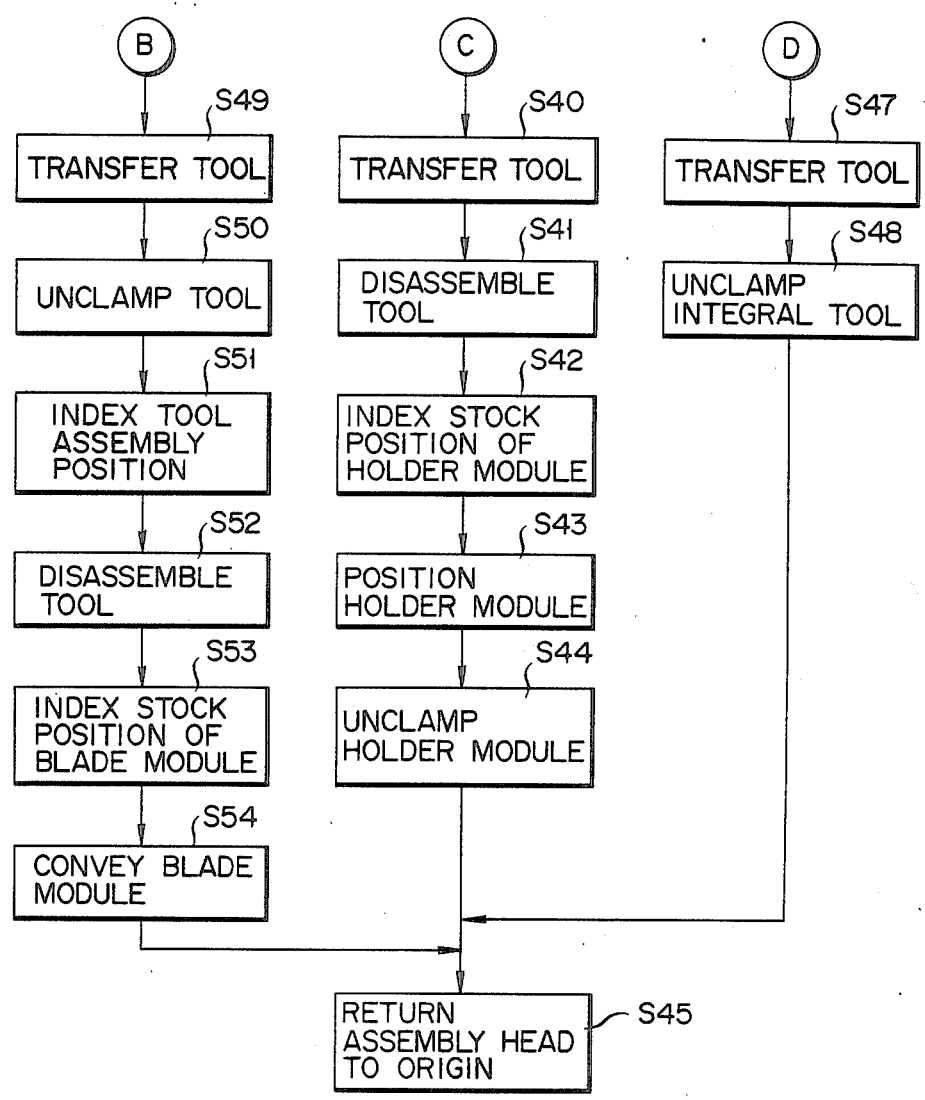

An example of disassembling a used modular tool will be described with reference to FIGS. 7A and 7B.

Used modular constituted tool A fed from a machine tool is temporarily stored in tool stocker 2 (steps S30 to S32). At this time, tool A is disassembled at assembly position 17 in the assembly stop mode, and the respective modules are stored in tool holder 13 of tool stock unit 1.

More specifically, a stock position of an unnecessary tool fed from the machine tool is indexed (step S34). Assembly head 6 of tool transfer unit 5 is positioned (step S35). Then, the tool is clamped by head 6 (step S36).

The type of tool clamped by head 6 is determined by control unit 7 (steps S37 and S38). When the tool is a rotating tool of a modular constituted tool, a blade module stock position of stock unit 1 is indexed (step S39). The clamped tool is then conveyed to the assembly position by transfer unit 5 (step S40) and is disassembled into the respective modules through the steps opposite to those for the above assembly steps (step S41). The stock position of holder module a at stock unit 1 is then indexed (step S42). Positioned module a is unclamped (steps S43 and S44) and is stored in stock unit 1. Assembly head 6 is returned to the origin (step S45) and the following steps are repeated.

When it is determined in step S38 that the tool clamped by head 6 is an integral tool, the stock position for the integral tool in stock unit 1 is indexed, and the tool conveyed to the stock position is unclamped by head 6 (steps S46 to S48).

When it is determined in step S37 that the tool clamped by head 6 is a stationary tool used in an NC lathe and the like, the tool is conveyed to movable table 73 by transfer unit 5, and head 6 unclamps the tool (steps S49 and S50). Table 73 indexes the tool assembly position (step S51), and coupling mechanism 81 removes the blade module from the holder module (step S52). When the stock position of the blade module is indexed by magazine 72 (step S53), the blade module is conveyed to the stock position by pivotal arm 74 and is held at a predetermined position (step S54).

An automatic tool assembly apparatus according to a second embodiment of the present invention shown in FIGS. 8 and 9 will be described.

The automatic tool assembly apparatus according to the second embodiment has a structure substantially the same as that of the first embodiment shown in FIGS. 1 to 4. The same reference numerals in FIGS. 8 and 9 denote the same or equivalent portions as in FIGS. 1 to 4, and a detailed description thereof is omitted.

Figure 8:
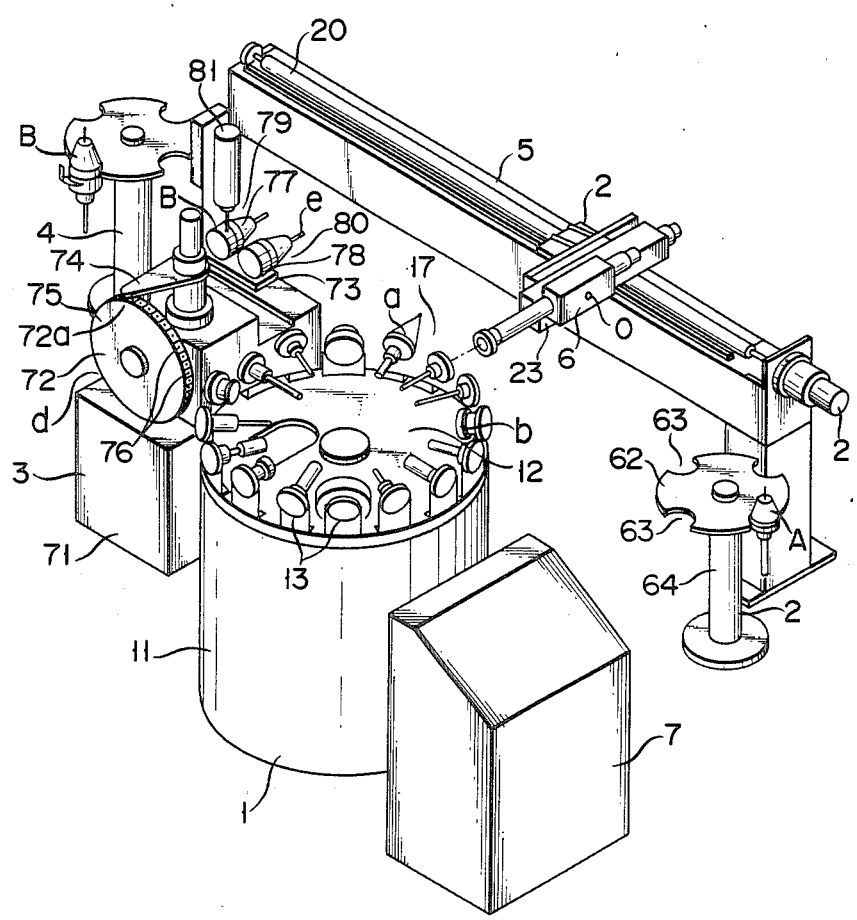
FIG. 8 is an overall perspective view of an automatic tool assembly apparatus according a second embodiment of the present invention which is different from the embodiment shown in FIG. 1.

As shown in FIG. 8, tool stock unit 1 has cylindrical main body 11. Turntable 12 rotated clockwise and counterclockwise by a drive unit (not shown) is provided on main body 11. A plurality of tool holding members 13 are provided on the outer peripheral portion of turntable 12. Holder module a, adapter module b, and blade module c that constitute modular constituted tool A are held by member 13 such that their axes are aligned in the horizontal direction.

Figure 9:
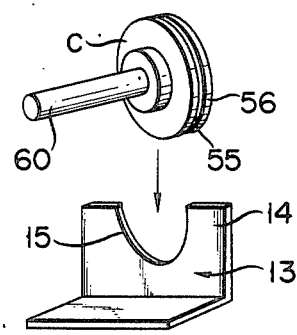
FIG. 9 is a perspective view of a tool holder of the tool stock unit of the apparatus shown in FIG. 8.

More specifically, each member 13 has L-shaped plate 14, and circular notch 15 is formed in the vertical wall of plate 14, as shown in FIG. 9. Each module is held such that its annular groove formed in its proximal end is fitted in notch 14 from above. As a result, modules are radially arranged on turntable 12 such that their distal ends are directed toward a central portion of turntable 12, and are then selectively positioned on assembly position 17 by a means to be described later.

Tool transfer unit 5 has guide rod 19 having two ends supported by frames 18, screw rod 20 driven by servo motor 22, and movable base 21 guided by rod 19 and engaged with rod 20. Movable table 23 reciprocal with respect to assembly position 17 and pivotal between vertical and horizontal positions is provided on base 21. Assembly head 6 is mounted on table 23. Therefore, head 6 is reciprocal with respect to position 17 upon movement of table 23, and can be directed in the horizontal or vertical direction.

Head 6 can hold and assemble respective modules a, b, and c held by holder 13, and has an arrangement similar to that of the first embodiment shown in FIG. 3.

Turning tool assembly unit 3, which assembles a tool used in a machine tool, such as an NC vertical lathe, is similar to the apparatus of the first embodiment. The similar portions of unit 3 as that of the first embodiment are denoted by the same reference numerals, and a detailed description therefor is omitted. In this embodiment, assembled modular constituted tool B is fed to tool stocker 4 for a turning tool. Stocker 4 for the turning tool has the same arrangement as stocker 2 for the modular tool, and a detailed description thereof is omitted.

The automatic assembly/feed apparatus shown in FIGS. 8 and 9 assembles and disassembles a modular constituted tool in the same manner as the apparatus of the first embodiment shown in FIGS. 1 to 4.

In the automatic tool assembly apparatus of this embodiment, when tool holder 23 holds holder module a, movable table 23 is pivoted upward about point O as a fulcrum. Therefore, module a held by assembly head 6 is pulled upward from tool holder 13 and is held in this state.

Turntable 12 is then rotated again by a tool designation signal for blade module c supplied from control unit 7. Subsequently, holder 13 holding module c is positioned at assembly position 17. At this time, table 23 is pivoted downward so that module a held by head 6 is caused to oppose module c horizontally held by holder 13 along a straight line. In this state, head 6 is moved forward, engaging pawl 54 of module a is engaged with engaging hole 59 of module c, and module c is coupled to module a. In other words, modules a and c are assembled in the horizontal direction.

Then, when tool A consisting of modules a and c is assembled by air cylinder 41 and motor 38, head 6 is pivoted upward again to pull module c from holder 13.

Head 6 is moved backward by the movement of table 23 and is then pivoted downward. In other words, tool A held by head 6 is vertically set with its module c facing downward, and is fed to tool stocker 2 by tool transfer unit 5.

This operation is repeated so that tools A are sequentially assembled at position 17, and are supplied to stocker 2 by transfer unit 5. Simultaneously, tool A temporarily stored in stocker 2 is conveyed to the machine tool in accordance with the processing order. Used tool A supplied from the machine tool is temporarily stored in stocker 2 and disassembled at position 17 while assembly of tool A is stopped. The respective modules are stored in holder 13 of stock unit 1.

When a designated tool is a tool used in an NC vertical lathe, turning tool assembly unit 3 is actuated in a similar manner to that in the first embodiment. In this embodiment, modular constituted tool B assembled at assemble position 79 is moved to exchange position 80 by the movement of movable table 73, is held by assembly head 6, and is supplied to tool stocker 2 for a turning tool by tool transfer unit 5. Tool B supported by stocker 2 is conveyed to a machine tool such as an NC vertical lathe.

In this manner, respective automatic tool assembly units can hold holder, adapter, and blade modules constituting a modular constituted tool by a tool holder of a tool stock unit, automatically and sequentially position the designated modules at assembly positions, and automatically assemble the respective modules by the assembly head. As a result, operability and safety can be greatly improved compared to the conventional manual assembly.

When the respective modules are vertically held by the tool holders, the attaching/detaching operation of the modules is performed in a uniaxial direction, i.e., vertically. Since the tool transfer unit is moved in another uniaxial direction, the modules can be assembled by the operation in a total of two axial directions and be supplied to the machine tool, thus achieving simplification of the entire apparatus and control.

When the respective modules are horizontally held by the tool holders, they can be attached/detached at a constant stroke irrespective of the length of each module, thus achieving simplification of the control of the movement stroke of the assembly head.

An automatic tool assembly apparatus according to another invention of the present application will be described with reference to FIGS. 10 to 18.

In this apparatus, only the blade module of the modular constituted tool can be stored in a magazine, so that the stock space and the size of the entire apparatus can be reduced.

Figure 10:
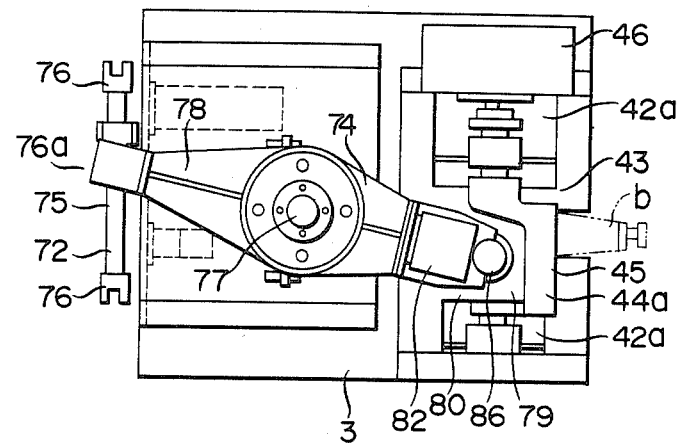
FIG. 10 is a plan view of an automatic tool assembly apparatus according to another invention.
Figure 11:
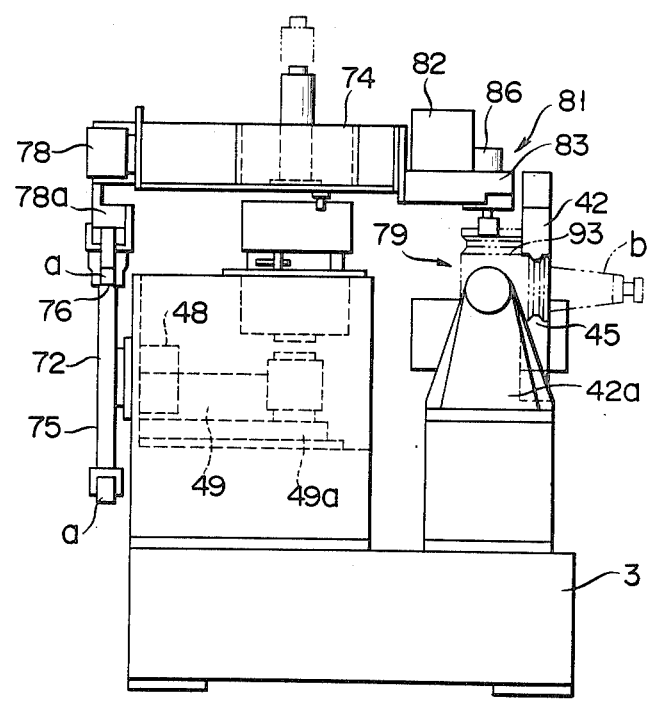
FIG. 11 is a side view of FIG. 10.

FIGS. 10 and 11 show an overall configuration of the automatic tool assembly apparatus for a turning tool, such as a lathe. This apparatus can be used in combination with the automatic tool assembly apparatus shown in FIGS. 1 to 4 and 8 and 9.

Referring to FIGS. 10 and 11, reference numeral 3 denotes a main body. Magazine 72 is provided on one side of main body 3. Magazine 72 comprises reversible disk 75, a plurality of tool holding sections 76 provided at the same angular intervals on the outer peripheral surface of disk 75, and motor 48 for driving disk 75. A plurality of blade modules a of different types which constitute modular constituted tool B are detachably inserted in section 76.

Assembly position 79 serving also as a disassembly position for tool B is provided to the other side of main body 3. As shown in FIGS. 12 to 14, holding mechanism 42 for holding holder module b of tool B is provided at position 79. Position 79 can be provided to the mount section of the machine tool. Reference numerals 42a denote a pair of support bases. Bearings 42b are provided to bases 42a. Rotating shafts 43a and 43b are rotatably provided to bearings 42b. Support frames 44a and 44b are fixed to shafts 43a and 43b. Clamp mechanism 45 for clamping module b in the radial direction is provided to frames 44a and 44b. Mechanism 45 can be rotated through 90° by drive motor 48 linked with shaft 43a and can be directed in the horizontal or vertical direction while clamping module b.

Figure 15:
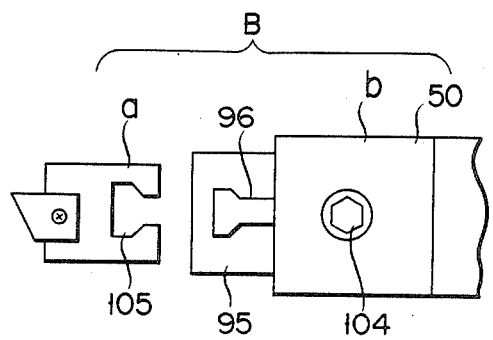
FIG. 15 is a plan view showing a relationship between the holder module and a blade module.
Figure 16:
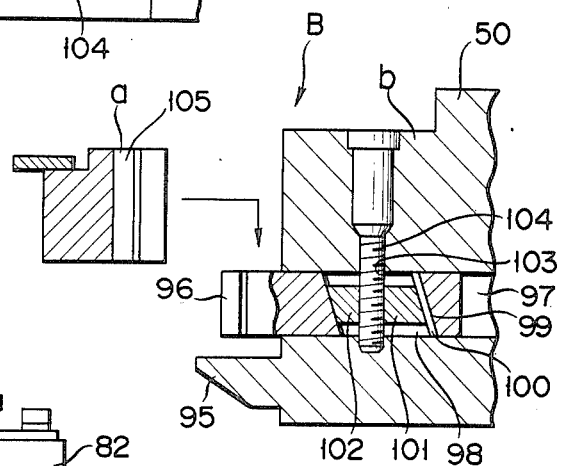
FIG. 16 is a vertical sectional view of the respective modules shown in FIG. 15.
Figure 17:
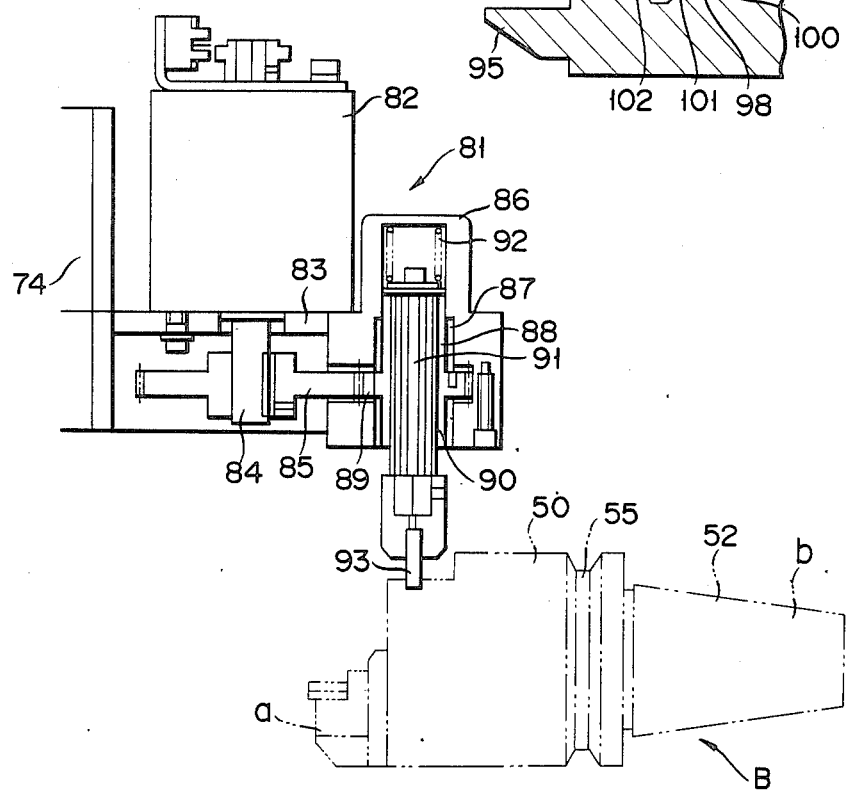
FIG. 17 is a partially sectional side view of a coupling mechanism of the automatic tool assembly apparatus shown in FIG. 10.

As shown in FIGS. 15 to 17, module b comprises tapered portion 52 mounted on the mount base of the blade module of the machine tool, and holder section 50 detachably fixed on portion 52. Annular groove 55 is formed in portion 52. Mechanism 45 holds module b by clamping groove 55.

Blade module reception base 95 is provided on the front face of holder section 50. Section 50 located on base 95 has draw bar 96 which is capable of moving forward and backward. The proximal portion of draw bar 96 is slidably inserted in guide hole 97 formed in section 50. Square tapered hole 98 is formed in the proximal portion of draw bar 96. Engaging portion 101 engageable with key groove 100 is formed in tapered surface 99 of hole 98 in the vertical direction. Slider 102 having a tapered surface coinciding with surface 99 is inserted in hole 98 to be vertically movable. Screw hole 103 is vertically formed in slider 102. Drive screw 104 inserted from an upper portion of holder 50 is screwed in hole 103.

When screw 104 is rotated clockwise, slider 102 is moved upward through hole 103. When screw 104 is rotated counterclockwise, slider 102 is moved downward through hole 103. When slider 102 is moved upward, draw bar 96 projects from guide hole 97. When module a is inserted from above in draw bar 96 provided on holder section 50 of module b, its engaging recess 105 is coupled with draw bar 96 and module a is integrally coupled with module b. Conversely, when draw bar 97 projects, it is disengaged from recess 105, thereby enabling disassembly.

As shown in FIG. 11, pivotal arm 74 is provided between magazine 72 and assembly position 79 on main body 3. Arm 74 is pivoted through 180° by rotation drive mechanism 49, such as a rotary actuator, having brake 49a, and is vertically moved by air cylinder 77. Chuck 78a which is opened/closed by rotary actuator 78 is provided at one end of arm 74. Nut runner 81 serving as a coupling mechanism is provided to the other end of arm 74. Chuck 78a has pawl sections 76a for clamping module a stored in stock section 76 of magazine 72 from two sides, so that it can mount and remove module a on and from section 76.

Nut runner 81 has an arrangement as shown in FIG. 17. Referring to FIG. 17, motor 82 is fixed to pivotal arm 74 through bracket 83. Drive gear 85 is fitted around rotating shaft 84 of motor 82. Gear housing 86 which is stationary with respect to bracket 83 is provided next to gear 85. Rotating cylinder 88 is rotatably supported in housing 86 through oil-impregnated bearing 87. Driven gear 89 engaged with drive gear 85 is provided on the outer surface of cylinder 88. Spline groove 90 is formed in the inner surface of cylinder 88. Spline shaft 91 is inserted in groove 90 to be vertically movable. Shaft 91 is biased downward by spring 92.

Clamp shaft 93 is mounted on the lower end portion of shaft 91, and clamps or releases drive screw 104 provided on holder section 50 of module b.

The automatic tool assembly apparatus for a stationary tool which has the above-mentioned arrangement is provided adjacent to, e.g., apparatus 45 for a rotating tool, as shown in FIG. 18. The apparatus selectively conveys stationary and rotating tools to tool stocker 2 by tool holding member 23 provided on tool transfer unit 5 connecting the same with apparatus 45, and conveys the tool from disk 62 of stocker 2 to a machine tool (not shown) through a transfer robot or the like. These components used for conveyance can be controlled by control unit 7.

The operation of the above tool assembly apparatus will be described.

Processing order for machining is determined based on the production control data and tools required for the machining. Then, a tool designation signal is input from control unit 7 to the automatic tool assembly apparatus. When the designated tool is, e.g., a stationary tool used in an NC lathe, disk 74 of magazine 72 is rotated by motor 48, and tool holding section 76 which stores designated blade module a is positioned and stopped at exchange position 76a.

Meanwhile, holder module b which is fed by tool holding member 23 of tool transfer unit 5 is clamped by clamp mechanism 45 provided at assembly position 79, and is held horizontally. Subsequently, pivotal arm 74 located at an upper position by air cylinder 77 is pivoted by rotating drive mechanism 49, and chuck 76a at one end side thereof opposes blade module a positioned at exchange position 76a.

When chuck 78a which is opened by rotary actuator 78 opposes the two sides of module a, it is closed to clamp module a. When chuck 78a chucks module a, arm 74 is moved upward and is pivoted through 180° by mechanism 49. Module a, which is chucked by chuck 78a upon pivotal movement of arm 84, then opposes holder module b positioned at assembly position 79.

When arm 74 is moved downward again, engaging recess 95 of module a is engaged with draw bar 96 provided on holder section 50 of module b and is placed on holder module reception base 95.

When module a is mounted on module b, arm 74 is moved upward and is pivoted through 180°. Thus, nut runner 81 provided on the other end of arm 74 opposes assembly position 79, and clamp shaft 93 of runner 81 opposes drive screw 104 provided on holder section 50 of module b. When arm 74 is moved downward again, shaft 93 is engaged with screw 104, so that motor 82 is driven.

Thus, rotation of shaft 84 is transmitted from drive gear 85 to rotating cylinder 38 via driven gear 89, and shaft 93 is rotated via spline shaft 91. Upon rotation of shaft 93, screw 104 is rotated clockwise, and slider 102 is moved upward inside hole 98, thereby contracting draw bar 96. Then, module a having recess 105 engaged with draw bar 96 is integrally coupled with module b, and assembly of tool A is completed.

When assembly of tool B is completed, arm 74 is moved upward, pivoted through 90°, and is held in a neutral state. When runner 81 is moved from assembly position 79 by the pivotal movement of arm 74, motor 46 is actuated to pivot support frames 44a and 44b through shaft 43a. When clamp mechanism 45 is pivoted through 90°, tool B is switched to be vertically oriented with tapered portion 52 of module b thereof facing upward.

When tool B waits at assembly position 79, tool transfer unit 5 is actuated and holds tapered portion 52 of tool B with its tool holding member 23. Then, tool B is conveyed from stocker 2 to position 79 of the automatic tool assembly apparatus by tool transfer unit 5.

At position 79, used tool B is vertically clamped by mechanism 45 of hold mechanism 42 and is switched to be oriented in the horizontal direction. When tool B is positioned at a predetermined position, arm 74 is pivoted to cause runner 81 to oppose mechanism 42. Then, drive screw 104 provided to the holder section 13 of module b is rotated counterclockwise by clamp shaft 93 of runner 81. Upon counterclockwise rotation of screw 104, draw bar 96 is projected, and the engagement of draw bar 96 with engaging recess 95 of module a is canceled. When arm 74 is pivoted through 180°, runner 81 escapes from position 79 and chucks module a by chuck 78a, and stores only module a in the tool stock section of magazine 72 by the pivotal movement of arm 74. Module b clamped by mechanism 45 of mechanism 42 is set in an assembly wait state for tool B used in subsequent machining. Thus, different types of blade modules a can be coupled to common holder module b.

In the automatic tool assembly apparatus, a chuck and a nut runner are provided to one and the other ends, respectively, of its pivotal arm. Therefore, the holder and blade modules can be chucked by a chuck using a nut runner, and a loss time required for selecting and picking up a blade module can be eliminated. Two pivotal arms can be arranged to intersect with each other as needed.

The automatic tool assembly apparatus can automatically and efficiently assemble and disassemble a blade module with respect to a holder module constituting a modular constituted tool. Also, since only the blade module is stored in a compact magazine, the entire apparatus can be made small. Furthermore, the automatic tool assembly apparatus can be linked with a machine tool through a tool convey unit and can be systematized, thus allowing unmanned operation.

The present invention has been described with reference to the accompanying drawings. However, the present invention is not limited to the above embodiments, and various changes and modifications may be made within the scope and spirit of the invention.

What is claimed is:

1. An automatic tool assembly apparatus having
   a tool stock unit for storing a modular constituted tool, which is constituted by a plurality of modules for a machine tool and is stored in units of separated modules thereof, a tool transfer unit for assembling a predetermined tool from a plurality of modules in said tool stock unit and conveying said predetermined tool therefrom, and a control unit, characterized in that:
   said tool stock unit holds said modular constituted tool disassembled into said modules, and a stock position of each required module corresponding to a tool requested by said machine tool is indexed from a signal from said control unit, and said modules are sequentially positioned at an assembly position; and
   said tool transfer unit has an assembly head movable in a direction to approach and separate from the assembly position, said assembly head can clamp said module positioned at the assembly position and is moved in a direction to separate from the assembly position in response to a signal from said control unit, sequentially assemble a clamped module to a module positioned at another assembly position to constitute a required modular constituted tool, and transfer said assembled modular constituted tool from said tool stock unit.

2. An apparatus according to claim 1, wherein said tool transfer unit has an assembly head movable in a direction to approach and separate from the assembly position when the assembly position is located on a tool mount section of said machine tool, and said assembly head sequentially clamps and assembles said modules in response to the signal from said control unit in order to constitute said required modular constituted tool, and can transfer said modules from said tool stock unit.

3. An apparatus according to claim 1, wherein said tool conveyed by said tool transfer unit is temporarily stored in a tool stocker provided in the vicinity of said tool stock unit.

4. An apparatus according to claim 1, wherein said tool stock unit has a first stock unit for holding said modular constituted tool which is a rotatable tool, said modules are held such that axes thereof are vertically oriented, and said assembly head of said tool transfer unit is arranged to reciprocate in the vertical direction and to be transversely movable with respect to said first stock unit.

5. An apparatus according to claim 1, wherein said tool stock unit has a first stock unit for holding said modular constituted tool which is a rotatable tool, said modules are held such that axes thereof are horizontally oriented, said assembly head of said tool transfer unit is arranged to reciprocate in the horizontal direction and to be transversely movable with respect to said first stock unit, and said assembly head is pivotal between a position for horizontally holding said tool and a position for vertically holding said tool.

6. An apparatus according to claim 4, wherein said first stock unit of said tool stock unit has a disk-like turntable, and the assembly positions are located on a straight line passing a center of said turntable.

7. An apparatus according to claim 4, wherein said first stock unit of said tool stock unit further stores an integral tool.

8. An apparatus according to claim 5, wherein said first stock unit of said tool stock unit further stores an integral tool.

9. An apparatus according to claim 4, wherein said tool stock unit further has a second stock unit for storing a modular constituted tool of a stationary tool, and a module held by said second stock unit is assembled by another assembly unit.

10. An apparatus according to claim 3, wherein said tool stocker holds an unnecessary tool discharged from said machine tool, said tool transfer unit moves said unnecessary tool to an assembly position while assembly of a tool is stopped, said assembly head disassembles said tool in units of modules in accordance with a designation signal from said control unit, and said first stock unit holds said modules at predetermined stock positions.

11. An automatic tool assembly apparatus having a magazine for storing and holding a plurality of types of blade modules of a modular constituted tool in an aligned state, said modular constituted tool consisting of a holder module and a blade module, and a pivot arm provided to be pivotal between a blade module exchange position and an assembly position, characterized in that:

said pivot arm has a chuck at an end side thereof which is capable of holding said blade module stored in said magazine, and a coupling mechanism at the other end side thereof which assembles said blade modules, held and conveyed by said chuck, to a holder module at the assembly position.

12. An apparatus according to claim 11, wherein said magazine has a disk which is rotatable clockwise and counterclockwise, and a plurality of tool stock sections are provided on an outer peripheral portion of said disk.

* * * * *